United States Patent
Prymak et al.

(10) Patent No.: US 7,969,711 B2
(45) Date of Patent: Jun. 28, 2011

(54) MULTIPLE ELECTRONIC COMPONENTS: COMBINATION CAPACITOR AND ZENER DIODE

(75) Inventors: John D. Prymak, Greer, SC (US); Eric Jayson Young, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 305 days.

(21) Appl. No.: 12/026,605

(22) Filed: Feb. 6, 2008

(65) Prior Publication Data

US 2009/0196005 A1 Aug. 6, 2009

(51) Int. Cl.
- *H01G 2/12* (2006.01)
- *H01G 9/00* (2006.01)
- *H01G 9/04* (2006.01)
- *H01G 4/228* (2006.01)

(52) U.S. Cl. .................................. 361/534; 361/533
(58) Field of Classification Search ................ 361/534, 361/533, 541
See application file for complete search history.

(56) References Cited

U.S. PATENT DOCUMENTS

| | | | |
|---|---|---|---|
| 4,100,479 A | 7/1978 | Buck | |
| 4,907,131 A | 3/1990 | Neal | |
| 4,989,119 A * | 1/1991 | Gouvernelle | 361/534 |
| 5,424,908 A * | 6/1995 | Kanetake | 361/534 |
| 5,424,909 A * | 6/1995 | Kuriyama | 361/534 |
| 5,502,614 A * | 3/1996 | Kuriyama | 361/534 |
| 5,889,445 A * | 3/1999 | Ritter et al. | 333/172 |
| 6,040,229 A * | 3/2000 | Kuriyama | 438/396 |

FOREIGN PATENT DOCUMENTS

JP 04002112 A * 1/1992

* cited by examiner

*Primary Examiner* — Eric Thomas
*Assistant Examiner* — David M Sinclair
(74) *Attorney, Agent, or Firm* — Joseph T. Guy; Nexsen Pruet, LLC

(57) ABSTRACT

A Zener diode—capacitor combination wherein a Zener diode is mounted in the capacitor body and connected in parallel with the capacitor after the capacitor has been voltage tested. A welded strap or jumper wire completing the diode circuit or a connection of separate terminations during soldering may be used to complete the circuit.

7 Claims, 4 Drawing Sheets

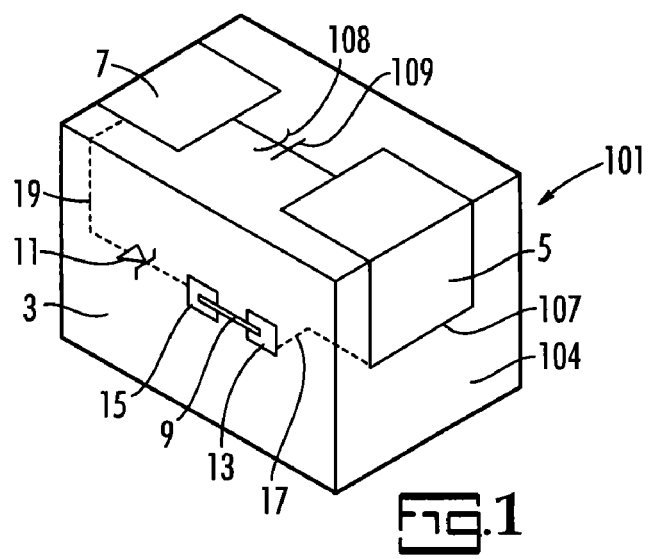
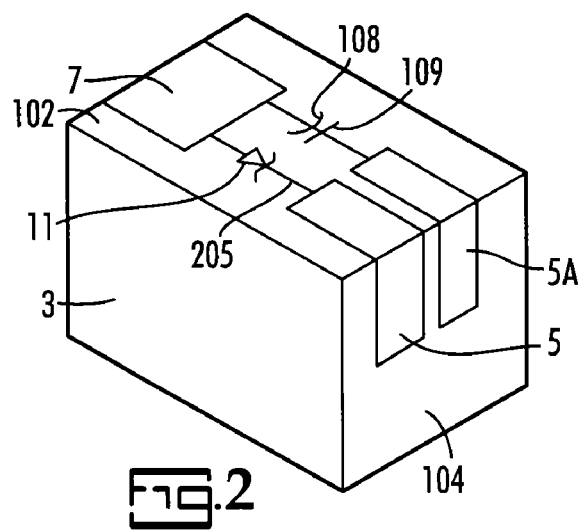

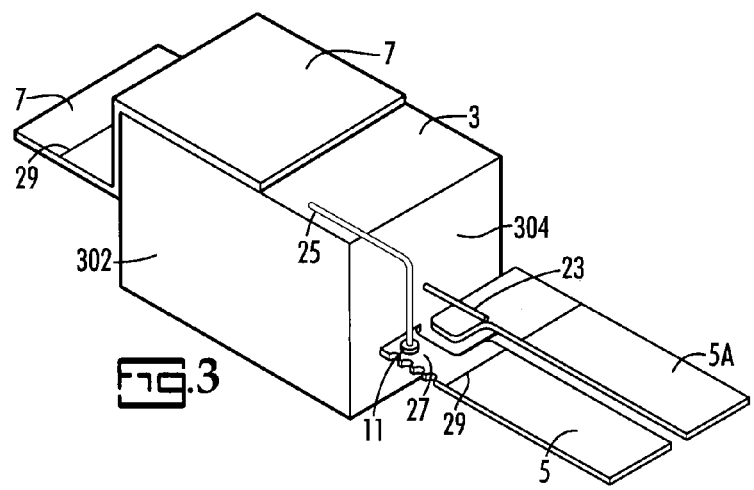
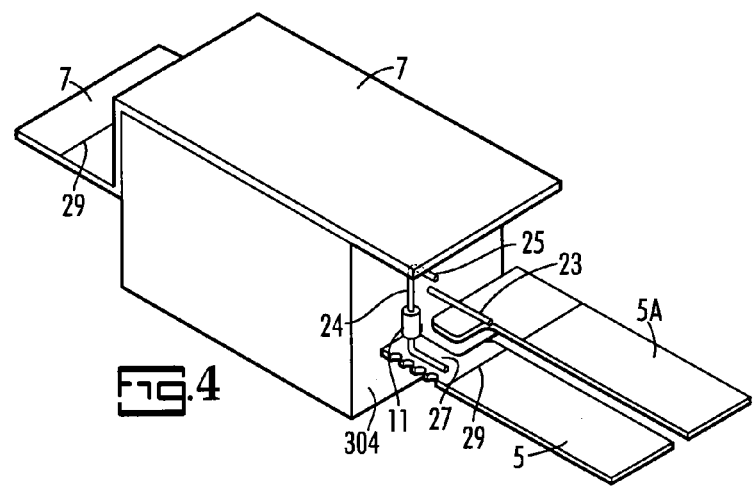

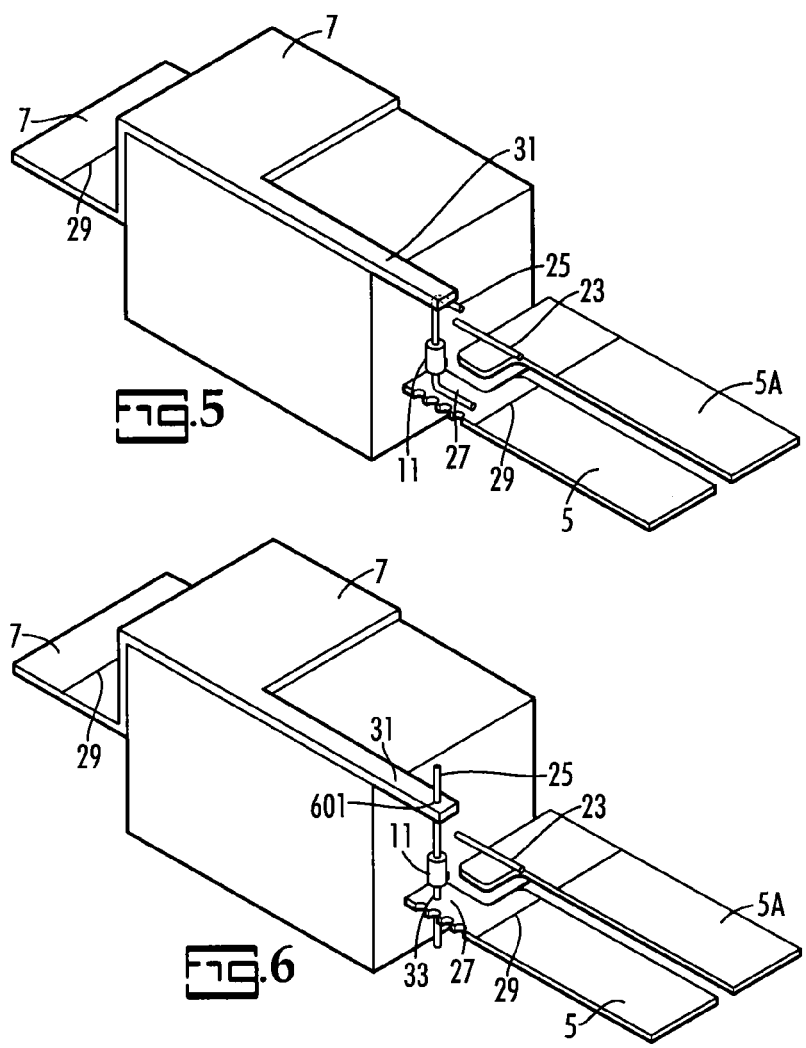

MULTIPLE ELECTRONIC COMPONENTS: COMBINATION CAPACITOR AND ZENER DIODE

FIELD OF THE INVENTION

This invention relates to multiple electronic components provided in the same physical package wherein the components can be burned in and tested separately during manufacture but connected together when fixed in the final application circuit.

BACKGROUND OF THE INVENTION

Overvoltage, especially from current surges, can cause capacitors to fail and render entire circuits non-functional.

For example, in automotive applications, the normal DC voltage is between 14 and 12 VDC. Surge conditions such as battery dropout can create overvoltage voltage levels to appear across the bus as high as 37 VDC.

For the regulated 12 VDC applications the recommended capacitor of choice would be a 25 WVDC capacitor. This follows manufacturer's recommendations that the voltage rating of the capacitor be at least twice the rated voltage. This headroom between rated and application voltage allows faults created during surface-mount solder reflow exposures to be undetected during application. If the voltage will be at 14 VDC nominal, such as in typical automotive use, then the recommended capacitor voltage would be at 35 WVDC.

As long as the voltage across the capacitor is maintained near that 50% of rated voltage level, the failure rates will be in the very low PPM. Once that voltage is exceeded, then the PPM level will rise geometrically with the applied voltage level.

All too often this overvoltage is overlooked, and because sample test of 20 to 100 units may not disclose high PPM failure rates, there are many opportunities to dismiss this failure. Ideally, every capacitor should be protected against overvoltage.

In conventional circuit designs, Zener diodes have been used in parallel with capacitors, such as in U.S. Pat. No. 4,100,479.

Combining a Zener diode in parallel with the capacitor, especially a polar capacitor, two potential faults to the capacitor are protected. Firstly, the Zener diode will clamp the voltage to a very specific voltage and prevent voltages above the level from being applied to the capacitor. Secondly, because the Zener depends on reverse or breakdown voltages for the Zener action, it will be forward biased for any reverse voltages, thereby eliminating the potential of applying a reverse voltage to the polar capacitor.

The concept of using a diode in the package with a capacitor to prevent reverse voltages has been presented with the diode in series with the capacitor. Using a Zener in parallel with the capacitor presents a problem in that if these devices are electrically connected before they are packaged the Zener prevents certifying any "headroom" for the capacitor over the Zener's breakdown voltage. The device would be effectively cleared up to the Zener voltage, and subsequent fault sites during the solder process could create faults activated before the Zener voltage is achieved. It is imperative that the capacitor and Zener remain independent of each other until the device is packaged into the packaging system or thereafter. The capacitor must be burned-in and tested to voltages well above the Zener voltage to create the required headroom. Any fault created in the dielectric during the solder process would be highest at the rated voltage of the capacitor, but the Zener is selected in such a manner that the maximum voltage applied to the in-circuit capacitor would be restricted to the Zener voltage, well below the rated voltage of the capacitor.

BRIEF DESCRIPTION OF THE INVENTION

It is a first object of this invention to provide a package with multiple components and terminal structure such that the components can be burned in and tested separately, but are connected together during packaging or in the final application circuit. It is a second object to reduce the number of components required on circuit boards. It is a third objective to provide protection of capacitors, especially Ta and Nb capacitors from damage due to overvoltage.

One method of attaining this capability is by means of an external pad arrangement apart from the standard termination leads such that after all manufacturing tests have been completed, these pads are connected together and the devices are joined and in parallel with the standard terminations.

These and other objects of the invention can also be attained by use of a lead frame which is designed such that separate contact can be made to multiple components during testing and burn in, but the components can be electrically connected prior to packaging or in the application circuit. One embodiment of this invention is a combination of a tantalum capacitor and a Zener diode packaged together in a single molded case and connected to the specially designed leadframe such that the capacitor can be burned in and tested at rated voltage, but in circuit the capacitor and Zener diode are connected together so that the capacitor is protected from voltages greater than its application voltage in the circuit.

BRIEF DESCRIPTION OF THE DRAWINGS

FIG. 1 shows an embodiment of a Zener diode Ta capacitor combination using an external jumper to finalize parallel connection of two components in the package.

FIG. 2 shows a second embodiment of a Zener diode and capacitor connections using a split leadframe keeping devices separated until board mount.

FIG. 3 through FIG. 6 shows embodiment of the possible internal connections of the two devices for the split leadframe device.

DETAILED DESCRIPTION OF THE INVENTION

Figure 7:
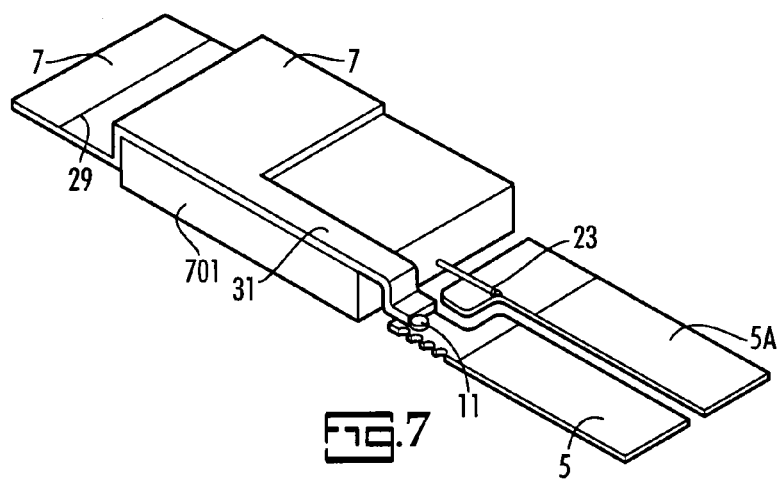
FIG. 7 shows another embodiment of the possible internal connections of the two devices for the split leadframe device for a thin or low-profile device.

The secondary element, a Zener diode in this instance, is formed separately from the primary element, the capacitor in this instance, and applied as a voltage controlling device to the circuit of the capacitor before or after the epoxy covering is applied by transfer molding to make the Zener diode and capacitor a single circuit with two shared nodes of contact.

This disclosure reveals two methods for creating this connection, post burn-in and electrical testing. The first involves creating two pads along the side face of the component to be connected before placement into the tape and reel shipping packaging. In KEMET's fused T496 capacitors (U.S. Pat. No. 4,907,131), there is a small amount of lead frame exposed to the side face to allow testing of the fuse element, apart from electrical connections involving the capacitor. An adaptation of this concept (FIG. 1) could bring two small metal pads (15 and 13) out to the side face 3, to be folded down along a side face of the finished body. In this instance, the capacitor (anode at 109 and cathode at 108) or primary element is connected to the main terminations (7 and 5), while the diode or secondary element 11 is connected between one of the main terminals 7 and one of these side terminals 15. A small wire 9 could be welded or soldered between these two small pads (15 and 13) to connect the Zener in parallel to the capacitor but only after electrical testing is completed on each element separately.

A second and preferred method of connecting these two devices post manufacturing would be by using a split lead frame (FIG. 2). The Zener's cathode 205 and the capacitor's anode 109 are never connected together until the piece is mounted to the solder pad on the PCB. The pad is a singular element with an area that encompasses both of the split sections (5 and 5A) of the anode leadframe in such a manner that as the device is mounted to the PCB, these two separate leadframes are connected together as they are soldered to a common pad.

In FIG. 1, the device is a plastic epoxy encased device 101 with metalized terminals 7 and 5 folded along the bottom face 102 after being folded down along the end face (104 shown but also mirrored on opposite side of unit). The leadframe originally extends out of the plastic case near the middle height point 107 along the end faces (104 shown). As shown in FIG. 1, the combination capacitor has an internal, and in this case the primary element capacitor with an anode termination 108 connected to external terminal 7 and cathode termination 109 connected to external terminal 5. A Zener diode 11, as secondary element, is located in a parallel circuit having electrical trace connected from its cathode contact 19 to anode termination 7 and a trace from its cathode contact to a termination pad 15 on the side face 3 of the unit. The pair of pads 15 and 13 on the side face 3 provides connection points to complete the secondary circuit but strap 9 is not applied until after the capacitor is tested for voltage rating across the terminations. The strap or jumper 9 is then applied and soldered, welded, or connected electrically and mechanically to pads 15, 13 to complete the circuit through traces 17 and 19.

A second method of connecting a Zener diode involves the use of a split lead frame and split terminations. As shown in FIG. 2 the Zener cathode and capacitor's split anode side 5, 5A are not connected until the terminations are mounted to a solder pad or printed circuit board. In this configuration, the voltage is regulated to the Zener voltage Details of the split leadframe, and connection for the two elements are shown in FIG. 3 through FIG. 7. The internal structures and connections are first detailed in FIG. 3. The cathode leadframe 7 as it enters the plastic case is typically bent up along the vertical face and then along the top face 3 of the capacitor's pellet structure, and extends along the top face of the pellet. The attachment of the leadframe to the pellet structure 3 is normally achieved using a conductive adhesive. The anode connection of the capacitor is normally achieved by welding the anode riser wire 23 to the first section of the cathode leadframe 5A. This leadframe is normally created by die punch and for this dual device would require that a split be maintained between the two segments of the leadframe 5 and 5A. The division could be modified as shown to allow the riser wire extending from the pellet's front face 304 at its center would still create a segment where only one half of the cathode leadframe 5A is in contact with the riser wire 306.

In FIG. 3, the diode is shown as a die 11 with one axial lead extending from the cathode contact of the diode. The die's anode body or base is attached at 27 to the other segment of the cathode leadframe 5. Attachment to the leadframe could be accomplished using solder or conductive epoxy. The axial wire extending from the diode's anode contact would then be attached to the silver epoxy along the top face 3 or side face 302 using a conductive epoxy, weld or solder.

In FIG. 4, the cathode plate 7 could be extended to go past the edge of the top face and end face 304. This would create a space separation of two plates, and an axial-leaded diode 11 could be connected between these plates by bending the diode's leads 25 and 27 to create segments where the lead is parallel to the plates 5 and 5A. These leads could then be solder or weld attached to the plates. The terminals are bent at 29.

In FIG. 5, the cathode plate 7 extension is narrowed to create a smaller extension segment 31. The diode attachment is the same as in FIG. 4.

In FIG. 6, then extension segment 31 is now drilled to accept a through-hole lead 601 to be solder or weld attach. A like hole is drilled in the split cathode leadframe 5 to accept another through-hole attachment 33 using weld or solder.

In FIG. 7, the device is shown as a low-profile adaptation. In this drawing the pellet 701 is a much lower profile than shown previously. The secondary element (diode) in this case would be required to also be in a low-profile configuration, such as a die. The split leadframe (5 and 5A) are as in previous drawings.

Figure 8:
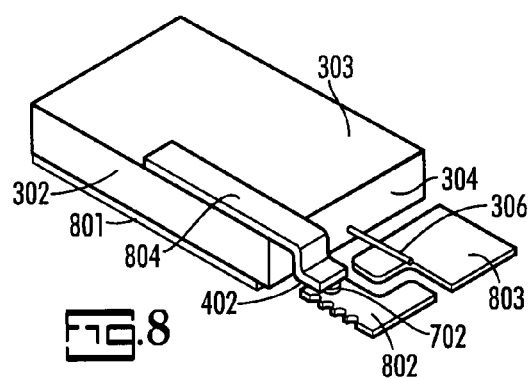
FIG. 8 shows an alternative face-down device with a cathode termination underneath the capacitor pellet.

FIG. 8 represents another variation of the package as a facedown termination device. The upper portion of the device is molded but the bottom face has the termination or leadframe plates exposed for contact. In this embodiment, the cathode plate 801 is attached to the bottom face of the capacitor pellet, 302, while the split leadframe is on the same plane as the cathode leadframe, 802 and 803, with the riser wire offset to afford a straight weld attachment to the leadframe 803 and the secondary element, a diode 702, would require an arm 804 attached to the top of the pellet 303, to create a secondary contact for the diode 702 attached to the other portion of the split leadframe 802.

Figures 9A, 9B:
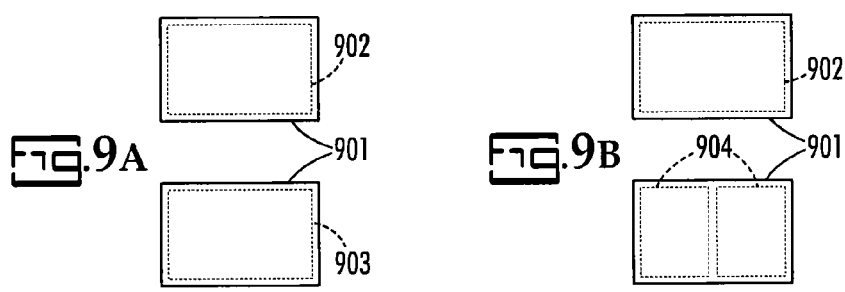
FIGS. 9A and 9B illustrated the different footprints for conventional terminations and the split from this invention.

FIG. 9A shows the typical two-terminal solder pads 901 required to mount this device to the PWB, and on the left, the outline drawing of the one of the device's terminations at solder pads 901 and the other at 903. On the right side of FIG. 9B, the solder pads are again shown 901 and the outlines of the termination for the first contact 902 and for the split leadframe 904. In attaching the split leadframes to the solder pad, the electrical connection of the parallel devices is created.

The invention has been disclosed with reference to preferred examples and embodiments which do not limit the scope of the invention disclosed. Modifications apparent to those with skill in the art are subsumed within the scope and spirit of the invention.

INDUSTRIAL UTILITY

The invention provides protection for polar capacitors during overvoltage and reverses voltage episodes on a PCB, eliminates the need for secondary components on the boards. The invention improves quality, reliability and durability of capacitors and the electronic devices in which they are used.

We claim:
1. An electronic device comprising:
   an encasement comprising no more than one capacitor and no more than one zener diode:
      a first leadframe extending from said encasement with a first terminal of said capacitor and a first terminal of said Zener diode in common electrical connection with said first leadframe wherein said first terminal of said capacitor and said first terminal of said Zener diode are of opposing polarity;

a segmented second leadframe extending from said encasement wherein said segmented second lead frame comprises a first segment and a second segment wherein a second terminal of said capacitor is in electrical connection with said first segment and a second terminal of said Zener diode is in electrical connection with said second segment.

2. An electronic device according to claim 1 wherein the capacitor has an anode material selected from metals or compounds capable of forming a dielectric oxide by electrochemical anodization.

3. A capacitor according to claim 2 wherein the anode material is selected from the group consisting of Ta, Nb, Ti, Zr, Hf, their alloys and oxides.

4. An electronic device according to claim 1 wherein the encasement is a non-conductive resin.

5. An electronic circuit containing the electronic device of claim 1.

6. Multiple electronic components in a single sealed package wherein each of said multiple electronic components is electrically connected to one common terminal extending from said package and each of said multiple electronic components is electrically connected to separate terminals extending from said package wherein no more than one component of said components is a capacitor and no more than one component of said components is a Zener diode wherein said capacitor has opposite polarity from said Zener diode.

7. Multiple electronic components according to claim 6 wherein one component is an electrolytic capacitor.

* * * * *